Patented May 19, 1931

1,806,388

UNITED STATES PATENT OFFICE

RICHARD A. CRAWFORD, OF AKRON, OHIO, ASSIGNOR TO THE B. F. GOODRICH COMPANY, OF NEW YORK, N. Y., A CORPORATION OF NEW YORK

AQUEOUS RUBBER DISPERSION AND METHOD OF MAKING SAME

No Drawing.   Application filed August 6, 1927.  Serial No. 211,263.

This invention relates to dispersions of rubber in an aqueous medium and particularly to dispersions which shall contain a low percentage of protective colloids and which shall have adhesive properties comparable with those of rubber dispersions in organic solvents. An object of the invention is therefore to provide a method of preparing aqueous rubber dispersions of the character indicated.

It has heretofore been proposed to utilize protective colloids as dispersing agents for rubber by a process which depends upon the mastication of the rubber and the swelling of the colloid to secure dispersion. In all such methods, however, a rather wide variation in particle size of the dispersed rubber is obtained and a comparatively high percentage of protective colloids, ranging from 10 to 25 percent of the rubber content, is required to produce a stable dispersion. This high percentage of protective colloid in the dispersion diminishes the natural tack of the rubber and imparts thereto other characteristics which are undesirable for many industrial operations.

Hitherto it was considered essential to the production of a stable rubber dispersion suitable for use in factory operations to incorporate stabilizing colloids in the rubber batch prior to the obtaining of the rubber in the dispersed phase. I have discovered that the stabilizing protective colloids may be added to the rubber batch after the dispersion has been effected and that, where so added, a much smaller proportion of stabilizing colloid is necessary to give any desired degree of stability to the dispersion, one percent of the weight of the rubber being in many cases sufficient.

The purpose of the present invention is to produce an aqueous dispersion of rubber, or a rubber-like substance, a dried or partly dried film of which shall have approximately the same characteristic surface tack and other properties as a dried or partly dried film of the same rubber-like substance dissolved in an organic solvent, or, in other words, to produce an aqueous dispersion of rubber which shall be able to give tacky films of the order which are obtained from the use of rubber cements.

In carrying out this invention, I preferably prepare the aqueous dispersion of rubber by mixing into rubber, or a rubber composition four to six percent of its weight of a peptizing agent, especially an alkali soap of a higher liquid fatty acid, the mixing being continued until a relatively soft rubber batch is obtained, then admixing with the batch while masticating water containing an alkali, such as a concentrated ammonia solution, or a dilute caustic solution, adding it slowly thereto, and preferably only as fast as the rubber batch will take it up, until a dispersion having the rubber in the internal or dispersed phase has been obtained. This dispersion is normally a viscous paste which is unstable and cannot be diluted with water without agglomerating the dispersed matter. I find, however, that this dispersion may be given satisfactory stability by the addition thereto after the completion of the dispersion of one or two percent of the weight of the original rubber or rubber composition of a stabilizing protective colloid, such as glue, casein, gum arabic, agar-agar, Irish moss or gum tragacanth, and that the dispersion may then be diluted to any desired consistency by the addition of water. Higher percentages of a stabilizing protective colloid may be employed, if desired, but larger quantities tend to reduce the tackiness of the dispersion film, and I find that from one to five percent of protective colloids give satisfactory products.

The following specific examples are illustrative of the processes of this application.

*Example 1.*—Crude rubber, 500 parts by weight, was broken down thoroughly on a rubber mill and placed in a Werner-Pfleiderer mixer. To the masticated rubber, 5 percent of potassium oleate was added and thoroughly mixed therein. The batch was continuoulsy stirred and 100 parts of concentrated ammonia solution (28 percent ammonia) were added slowly in order to permit the batch to take up the solution as added. By the time the solution had been completely taken up by the batch, the rubber particles were reduced to a colloidal size and were in a dispersed condition. Tests showed this dispersion to be rather unstable and that it could not be diluted with water. To the dispersion in the mixer were added with stirring one percent each of casein and gelatin, mixed with water in the form of a thin paste, whereupon the dispersion was stibilized and could be thinned to any desired concentration with water. The dried film obtained from a layer of this dispersion from which the water had been evaporated resembled that obtained from a rubber cement in stretch, tack and color, and the dispersion itself when diluted resembled latex very closely in general characteristics.

*Example 2.*—It is preferable in most commercial operations to utilize dispersions containing vulcanizing agents and/or other ingredients. Thus, a rubber composition containing 75 parts by weight of rubber, 15 parts zinc oxide, 4.5 parts sulfur, 0.5 parts organic accelerator, and 5 parts softener were admixed on the usual rubber mill and 4 parts potassium oleate added thereto during mastication. When the batch was thoroughly masticated, it was placed in a Werner-Pfleiderer mixer and 100 parts of concentrated ammonia added thereto as fast as the rubber composition would take it up. In certain cases, it was found necessary, depending on the quantity and character of pigments present in the batch, to add a further small quantity of a dilute ammonia solution, say a 6 percent solution, to disperse completely the rubber composition. The viscous mass thus formed was then stabilized by adding thereto, with a continuation of the mixing action, a protective colloid paste, comprising one part by weight of casein, one part of gelatin and one part of a concentrated ammonia solution. When thoroughly admixed the resulting dispersion could be thinned to any desired concentration, and when so diluted readily formed tacky coherent films of the character described in the preceding example.

*Example 3.*—The process of the two preceding examples is also applicable to soft vulcanized and reclaimed rubbers. Thus, two parts by weight of reclaimed rubber and 1 part of mineral rubber were thoroughly admixed with the addition of 4 percent of potassium oleate, based on the total weight of the batch. Ammonia solution was then added to the batch slowly until the dispersion of the rubber was effected, and the batch then stabilized by the addition of one percent glue and one percent casein, in the same manner as in the preceding examples. The product obtained was a viscous mass which could be readily diluted with water to form a stable aqueous dispersion of any desired consistency.

*Example 4.*—It may be desirable in certain instances to form the peptizing agent in situ in the rubber batch. This may be accomplished by adding to the rubber batch during mastication a higher fatty acid and an alkali in suitable proportions to form the peptizing agent. Thus, to 100 parts by weight of rubber are added 5 parts by weight of oleic acid and 1 part of caustic potash in water solution. When the ingredients are thoroughly mixed and the rubber batch softened, an alkali solution, either caustic or ammonia, is added slowly to the batch until the rubber is dispersed, and stabilizing colloids are then added in the manner described in connection with Example 1, the product being in all substantial respects like the product of that example.

The herein described process may be carried out entirely upon the rolls of the ordinary rubber mill or entirely in an internal mixer of the rotary blade type. In Examples 1 and 2, the process has been described as carried out in two steps, the masticating and admixture of ingredients into the rubber on an ordinary rubber mill, and the further admixture with ammonia solution in an internal mixer. While this seems to be a preferable manner of carrying out the invention from a practical standpoint, it is to be understood that the invention is not limited to such a procedure but that satisfactory results may be obtained by utilizing any suitable masticating apparatus.

It is to be understood that in place of potassium oleate described as the peptizing agent in the above examples soaps of the higher fatty acids, such as potassium stearate, sodium stearate, sodium oleate, diethylamine oleate, ammonium oleate and the like, and commercial soaps, such as Ivory soap, Palmolive soap, castile soap and the like, may also be employed. Further, other alkali solutions may be employed as a dispersion medium, a 5 percent solution of either potassium hydroxide or sodium hydroxide, or a 10 percent solution of diethylamine giving satisfactory results when substituted for the concentrated ammonia solution of the above examples. Further, it is to be understood that the term "rubber" as herein employed is intended to include crude, vulcanized and reclaimed rubber, or rubber-like substances, such as balata, gutta percha, and similar artificial rubber isomers, either or not in admixtures of two or more of these substances and/or admixed with compounding ingredients and vulcanizing agents.

The dispersions made in accordance with the process of this application in comparison with dispersions produced by other methods, have a greater fineness and better uniformity of particle size and when used as an adhesive have a better tack and increased stretch when unvulcanized and a stronger adhesion when vulcanized in rubber goods. Such aqueous dispersions are superior to cements for industrial uses for several reasons: An aqueous dispersion containing a given percentage of rubber is much more fluid than is a cement containing the same amount of rubber, and hence it may be spread, brushed or otherwise applied with greater ease, smoothness and uniformity. Moreover cements containing more than 10 to 15% of rubber have been found to be impractical for coating operations while aqueous dispersions of rubber containing thirty to forty percent of rubber may be readily employed. Again, the fire hazard incident to the use of rubber cements is entirely eliminated by the employment of aqueous dispersions. Other advantages, such as economy in manufacture and in use will be obvious to those skilled in this art.

While four specific examples have been herein given by way of illustration, it is obvious that numerous variations and modifications of the processes of these examples may be employed without departing from the principles of this invention, and I therefore do not intend to limit the scope thereof except as indicated in the appended claims.

I claim:

1. The method of preparing an aqueous dispersion of rubber which comprises admixing a small percentage of a peptizing agent into rubber with mastication and thereafter slowly adding to the rubber while masticating it an alkaline water solution until the rubber is embodied in the dispersed phase of the batch being masticated, then admixing with the dispersion thus formed a small percentage of a stabilizing protective colloid substantially incapable of peptizing dispersions in such small percentages.

2. The method of preparing an aqueous dispersion of rubber which comprises adding at least four percent of an alkali soap of a liquid higher fatty acid to a rubber composition during mastication, thoroughly masticating the rubber composition, adding slowly thereto while continuing the mastication a water solution of ammonia until the rubber is embodied in the dispersed phase of the batch, then admixing thereinto one percent or more of a nitrogenous protective colloid.

3. The method of preparing an aqueous dispersion of rubber which comprises adding four to six percent of potassium oleate to a rubber composition, thoroughly masticating the batch, adding to the batch while masticating a water solution of ammonia as fast as the batch will take up the solution, continuing the addition of the water solution of ammonia until the rubber is embodied in the dispersed phase of the batch, and thereafter adding to the dispersion thus formed one to five percent of a stabilizing protective colloid comprising a protein.

4. The method of preparing an aqueous dispersion of rubber which comprises mixing into rubber compounding and vulcanizing agents and also four to six percent of an alkali soap of a higher fatty acid, masticating the rubber batch thoroughly and adding thereto during mastication a water solution of ammonia as fast as the batch will take up the solution, continuing such addition of ammonia solution and the mastication until the rubber is embodied in the dispersed phase of the batch, and admixing into the dispersion thus formed two to five percent of a nitrogenous stabilizing protective colloid comprising a protein.

5. The method of preparing an aqueous dispersion of rubber which comprises breaking down on a rubber mill a rubber composition and adding thereto during mastication four to six percent of its weight of potassium oleate, further masticating the batch and adding thereto a concentrated water solution of ammonia substantially not faster than the batch will take up the solution until the rubber is embodied in the dispersed phase of the batch, and thereafter mixing into the batch approximately one percent each of casein and gelatin in the form of a thin alkaline paste.

In witness whereof I have hereunto set my hand this 3rd day of August, 1927.

RICHARD A. CRAWFORD.